J. MANY.
TENOMETER.
APPLICATION FILED MAY 22, 1919.
1,331,777. Patented Feb. 24, 1920.
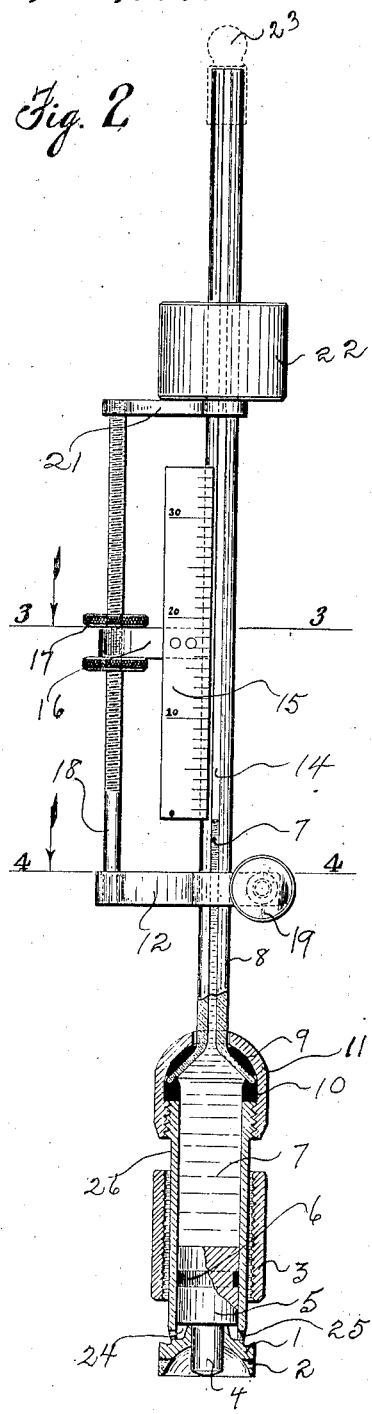
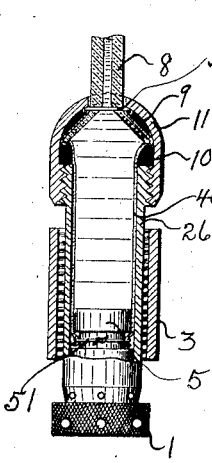
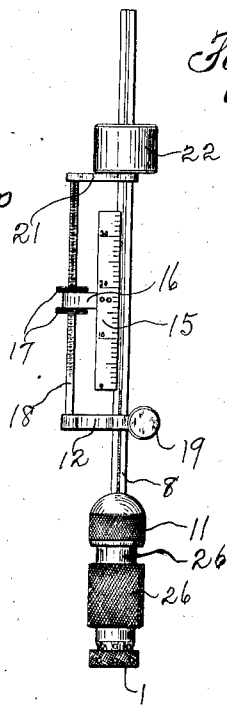
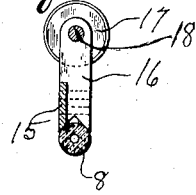
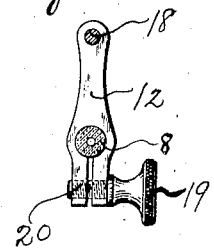
Inventor
Julius Many
By his Attorneys
Mock & Blum

UNITED STATES PATENT OFFICE.

JULIUS MANY, OF NEW YORK, N. Y.

TENOMETER.

1,331,777.	Specification of Letters Patent.	Patented Feb. 24, 1920.

Application filed May 22, 1919. Serial No. 299,040.

*To all whom it may concern:*

Be it known that I, JULIUS MANY, a citizen of France, residing at New York, in the county of New York and State of New York, have invented certain new and useful Improvements in Tenometers, of which the following is a specification.

My invention relates to an instrument for accurately determining the internal pressure of the aqueous humor of the eye, as well as the general internal pressure of the entire eye ball. In many diseases of the eye, the transparent gelatinous mass which fills the eye becomes hardened and it is of the highest importance for the physician to be able to accurately determine this condition.

Up to the present time no reliable and accurate instrument has ever been devised or used and physicians still rely upon tapping the eye ball with the tips of their fingers. Of course, this can never give accurate results and for many years this has been a serious problem for physicians who specialize in the treatment of the eye.

According to my invention, a light, simple and accurate instrument is provided which gives the internal condition of the eye with great precision and also prevents the eye from being injured while the test is being made.

Other objects of my invention will be set forth in the following description and drawings which illustrate a preferred embodiment thereof.

Figure 1 is an elevation.

Fig. 2 is an elevation on a larger scale, partially in section.

Fig. 3 is a cross section on the line 3—3 of Fig. 2 in the direction of the arrow.

Fig. 4 is a cross section on the line 4—4 of Fig. 2 in the direction of the arrow.

Fig. 5 is an elevation of the funnel which is used for pouring mercury into the instrument.

Fig. 6 is an elevation of the cap which is used to close the tube of the instrument.

Fig. 7 is a vertical section showing another embodiment.

The parts are drawn to scale although my invention is not limited to the particular proportions shown in the drawings. Similar reference numerals indicate similar parts in all the drawings.

A metal tube 26 is connected to a glass tube 8 of much smaller internal diameter by means of washers 9 and 10 which are made of any suitable soft material, and by means of the cap 11, which is perforated to allow the glass tube 8 to pass through the upper part thereof, and which is connected to the upper part of the metal tube 26, by coöperating screw threads, as clearly shown in Fig. 2. A piston 5 having a piston ring 6 preferably made of rubber or other suitable material, is located in the cylindrical bore of the tube 26 and has a projecting plunger 4.

The tube 26 is extended at its lower end into an enlargement 1 having a series of holes 2 which are preferably at right angles to the axis of the tube 26, and it also has a constriction adjacent the enlargement 1, which serves as a stop to prevent the piston 5 from falling out, and also forms a continuous cup-shaped groove 24 which communicates with the exterior by the holes 25 whose axes are preferably parallel to the axes of the holes 2.

The upper end of the enlargement 1, adjacent the holes 25 is also formed into a cup-shaped groove. A collar 3 is loosely mounted upon the tube 26. The collar 3 is internally threaded, the threading at the upper end thereof being preferably somewhat broken away to such a slight degree that it is not apparent in the drawings herein, so that the collar 3 can be turned around until it passes around the threading at the top of the tube 26 before the cap 11 is applied thereto, and it then is prevented from falling off by the enlargement 1, which preferably has substantially the same external diameter as the diameter of the cap 11.

In this manner, the parts can be readily assembled because the piston 5 is first slipped into the tube 26, then the cap 3 is slipped over the tube 26 so that it normally rests upon the enlargement 1, when the instrument is held in the upright position and then the glass tube 8 is connected by means of the washers 9 and 10 and the cap 11, to the tube 26.

The instrument can then be filled with mercury 7, by placing the funnel 30 at the top of the tube 8 and after a suitable amount of mercury has been poured into the tube, so as to substantially fill the bore of the tube 26, and extend a little above the cap 11, the tube 8 can then be closed by the cap 23. A threaded upright 18 is connected to the glass tube 8 by a cross bar 21, which has a perforation through which the glass tube 8 passes. The upright 18 is provided at its lower end with a cross bar 12 having a split end which is adapted to embrace the tube 8, the split ends of the cross bar being held together with sufficient pressure by the set screw 19, which has a threaded projection 20, which passes through the split or fork at the end of the cross bar 12.

Two adjusting screws 17 are internally threaded so as to coöperate with the threading of the upright 18, and are adapted to actuate its perforated scale arm 16 which is perforated so as to allow the upright 18 to pass through it. This scale arm 16 carries a scale 15 which is suitably subdivided.

As shown in Fig. 3, the end of the scale arm 16 and the end of the scale 15 form a V so as to prevent any revolution of the scale 15 with respect to the glass tube 8.

A weight 22 can be slid over the glass tube 8, so as to rest upon the upper cross bar 21.

The operation of this device is as follows:—

A normal person whose eyes may be taken as one hundred per cent. perfect as far as this relates to the internal pressure of the eye, is placed in a recumbent position and his eyelid is lifted so as to expose the eye ball while some cocaine is rubbed on the eye ball so as to render it insensible to pain.

The instrument shown in Fig. 2 is then placed in a vertical position, the physician holding the collar 3 gently in one hand so as to hold the instrument in the upright position without, however, pressing on the eye ball. The pressure on the eye ball is secured by the weight 22, and the instrument is so placed that the plunger 4 bears directly upon the pupil of the eye. Of course, the eye immediately begins to water profusely, but this liquid escapes through the holes 2, and does not affect the accuracy of the reading of the scale 15. The plunger 4 is pushed upward a distance depending upon the fluidity of the humors of the eye and upon the internal pressure, so that the column of mercury 7 is forced above the zero point of the scale, to a definite height. Of course, the scale is adjusted so that the column of mercury 7 in the tube 8 is at one of its divisions before the instrument is applied to the patient.

The instrument can thus be calibrated with any given weight 22, so that it affords a very accurate indication to the internal condition of the patient's eye. It is very difficult to make the packing ring 6 sufficiently loose so as to enable the piston 5 to be readily connected and moved without having a certain amount of leakage of the mercury 7. It is highly undesirable to have this mercury come into contact with the naked eye ball of the patient, and this is guarded against because the said escaping mercury collects in the cup-shaped groove 24 and passes on through the holes 25 and then collects in the cup-shaped groove at the upper end of the enlargement 1, where it can be readily seen and shaken off.

In the embodiment shown in Fig. 7 the packing ring 6 is eliminated as this always has a certain amount of friction which is not always desirable. In this embodiment a bag 40 of soft rubber is suitably secured to the end of the tube 8, and the other end of the bag, which is perforated, is slipped over the piston 5 and secured to the groove thereof, as is clearly shown in Fig. 7. The bag 40 is secured to the tube 8 and the piston 5 by the members 50—51 which may be cords or any equivalent device. If the cord 51 is tightly secured to the groove of the piston 5, all leakage of the mercury in the bag 40 is substantially prevented. The soft flexible walls of the bag 40 are supported by the reservoir tube 26. By this construction, the piston 5 can freely move up and down, carrying with it the lower end of the bag 40, so that the level of the mercury of the tube 8 is raised or lowered exactly as in the construction illustrated in the other figures. In the construction shown in Fig. 7, washer 10 may be omitted. The construction shown in Fig. 7 is so sensitive that if desired the weight 22 may be made very light or even omitted. The instrument described in this specification may be called a tenometer.

I have described a preferred embodiment of my invention, but it is clear that numerous changes and omissions could be made without departing from its spirit.

I claim:

1. In a tenometer having a reservoir containing a fluid, the combination of a vertical tube having its lower end connected to said reservoir, a piston having a plunger at its lower end and adapted to move up and down in the said reservoir so as to change the level of the liquid in the said tube, and a member surrounding the said plunger and adapted to support the instrument upon the eyeball of the patient.

2. In a tenometer having a reservoir containing a fluid, the combination of a vertical tube having its lower end connected to said reservoir, a piston having a plunger at its lower end and adapted to move up and down in said reservoir so as to change the level of the liquid in the said tube, and a cup-shaped member surrounding the said plunger and adapted to support the instrument upon the eyeball of the patient, the said cup-shaped member having a series of perforations therein for carrying away any liquid which may be secreted by the said eyeball.

3. In a tenometer, the combination of a glass tube having a reservoir secured thereto, a flexible rubber bag open at its top and bottom and having its upper end secured to the bottom of the said tube, said bag having its body located within said reservoir, and a piston secured to the bottom of the said bag so as to close the lower end thereof, the said piston being adapted to move up and down in the said reservoir and having a plunger adapted to rest upon the eyeball of the patient, the said instrument having a member adjacent the said plunger and adapted to support it upon the eyeball of the patient.

4. In a tenometer, the combination of a reservoir tube adapted to support a body of fluid, a piston located within the said reservoir tube and adapted to move up and down therein, so as to move any fluid within the said reservoir tube, the said piston having a plunger adapted to rest upon the eyeball of the patient, and the said instrument having a member adjacent the said plunger and adapted to support it on the eyeball of the patient, the said reservoir tube having a flange at its lower end and a threaded flange at its upper end, an internally grooved collar adapted to be passed over the said upper flange, the internal diameter of the said collar being less than the external diameter of the lower flange of the said reservoir tube so that the said collar is held loosely in place on the said reservoir tube, and a gage tube connected with the said reservoir tube so that any movement of the fluid within the said reservoir tube produces a corresponding movement of the fluid in the said gage tube.

5. In a tenometer, the combination of a reservoir tube having a threaded flange at its upper end, a piston adapted to move up and down in the said reservoir tube and having a plunger at its lower end, a member adjacent said plunger and adapted to support the instrument on the eyeball of the patient, a gage tube, a cap having a perforation through which the upper end of the said gage tube passes and a washer intermediate the top of the said cap and the bottom of the said gage tube and another washer intermediate the top of the reservoir tube and the bottom of the said gage tube, the end of said cap being adjacent the threaded flange of the reservoir tube and being correspondingly threaded, so that the screwing together of the said cap and the said reservoir tube, compresses the said washers and holds the gage tube in fixed position with respect to the said reservoir tube.

6. In a tenometer, the combination of a gage tube connected to a reservoir tube having a piston adapted to move up and down therein, the said piston having a plunger adapted to rest upon the eyeball of the patient, the instrument having a member adjacent the said plunger adapted to support it on the eyeball of the patient, and a gage secured to the instrument, the end of the gage adjacent the said gage tube being so shaped that it contacts therewith on opposite sides of the longitudinal axis of said tube, so that any turning movement of the said gage with respect to the said gage tube is prevented.

In testimony whereof I hereunto affix my signature.

JULIUS MANY.